United States Patent [19]

Liu

[11] Patent Number: 4,564,658

[45] Date of Patent: Jan. 14, 1986

[54] THERMOPLASTIC POLYESTER-LINEAR LOW DENSITY POLYETHYLENE MOLDING COMPOSITIONS

[75] Inventor: Ping Y. Liu, Naperville, Ill.

[73] Assignee: General Electric Company, Pittsfield, Mass.

[21] Appl. No.: 444,228

[22] Filed: Nov. 24, 1982

[51] Int. Cl.[4] ............................................. C08L 67/02
[52] U.S. Cl. ..................................... 525/177; 525/64; 525/67; 525/146; 524/504; 524/513; 524/508
[58] Field of Search ........................................ 525/177

[56] References Cited

U.S. PATENT DOCUMENTS

| | | | |
|---|---|---|---|
| 3,405,198 | 10/1968 | Rein | 525/177 |
| 3,769,260 | 10/1973 | Segal | 260/40 R |
| 3,900,549 | 8/1975 | Yamane et al. | 264/176 F |
| 3,937,757 | 2/1976 | Seydl et al. | 260/873 |
| 3,944,699 | 3/1976 | Mathews et al. | 428/220 |
| 3,953,394 | 4/1976 | Fox et al. | 260/40 R |
| 4,046,837 | 9/1977 | Carroll, Jr. | 260/873 |
| 4,076,698 | 2/1978 | Anderson et al. | 526/348.6 |
| 4,081,424 | 3/1978 | Gergen et al. | 260/42.18 |
| 4,097,446 | 6/1978 | Abolins et al. | 260/40 R |
| 4,122,061 | 10/1978 | Holub et al. | 260/40 R |
| 4,128,607 | 12/1978 | Shiomura et al. | 260/878 B |
| 4,185,047 | 1/1980 | Cohen | 525/94 |
| 4,217,426 | 8/1980 | McConnell et al. | 525/173 |
| 4,288,573 | 9/1981 | Karin | 525/177 |
| 4,290,937 | 9/1981 | Cohen | 260/40 R |
| 4,327,198 | 4/1982 | Weemes | 525/177 |
| 4,354,009 | 10/1982 | Goeke et al. | 526/125 |
| 4,401,785 | 8/1983 | Liu | 524/508 |
| 4,448,913 | 5/1984 | Coleman | 523/455 |
| 4,461,871 | 7/1984 | Kometani et al. | 525/166 |
| 4,463,121 | 7/1984 | Gartland | 524/291 |
| 4,476,274 | 10/1984 | Liu | 524/445 |

FOREIGN PATENT DOCUMENTS 0004645 10/1979 European Pat. Off. .

OTHER PUBLICATIONS

Heinert, O. H.; Polycarbonate Blends with Improved Critical Thickness, Research Disclosure, Aug. 1981, p. 309, #20810.
New Route to Low-Density Polyethylene, Chemical Engineering, Dec. 3, 1979, pp. 80-85.
Bird, C., "On Fast Track to Film Markets Linear Low PE", Plastics World, Dec. 1981, pp. 69-72.

Primary Examiner—John C. Bleutge
Assistant Examiner—Patricia Short
Attorney, Agent, or Firm—Edward K. Welch, II; William F. Mufatti; John W. Harbour

[57] ABSTRACT

A modified thermoplastic molding composition having improved compatibility and mold releasability the composition comprising a thermoplastic polyester resin selected from the group consisting of polyethylene terephthalate, poly(1,4-butylene terephthalate), a copolyester or any combination thereof and from about 0.1 to about 20% by weight based on the total composition of linear low density polyethylene. Optionally, the composition may have added thereto an effective amount of an aromatic polycarbonate for impact strength. The compositions may also contain an effective amount of at least one additive selected from the group consisting of fillers, reinforcing agents, nucleating agents, flow promoters, coloring agents, flame retardants, coupling agents and stabilizers.

7 Claims, No Drawings

THERMOPLASTIC POLYESTER-LINEAR LOW DENSITY POLYETHYLENE MOLDING COMPOSITIONS

This invention relates to modified thermoplastic molding compositions having improved compatibility including weld line strength, reduced plate out, and improved mold releasability.

High molecular weight linear polyesters and copolyesters of glycols and terephthalic or isophthalic acid have been available for a number of years. These are described inter alia in Whinfield et al, U.S. Pat. No. 2,465,319, and in Pengilly, U.S. Pat. No. 3,047,539, both incorporated herein by reference.

With the development of molecular weight control, the use of nucleating agents and two-step molding cycles, poly(ethylene terephthalate) has become an important constituent of injection moldable compositions. Further, poly(1,4-butylene terephthalate), because of its very rapid crystallization from the melt, is uniquely useful as a component in such compositions. Work pieces molded from such polyester resins, in comparison with other thermoplastics, offer a high degree of surface hardness and abrasion resistance, high gloss and lower surface friction.

Furthermore, the dimensional stability of poly(1,4-butylene terephthalate) injection moldings is very good even at temperatures near or well above the glass temperature of poly(1,4-butylene terephthalate). Additionally in particular, poly(1,4-butylene terephthalate) is much simpler to use in injection molding techniques than poly(ethylene terephthalate). For example, it is possible to injection mold poly(1,4-butylene terephthalate) at low temperatures of from about 30° to 60° C. to produce highly crystalline dimensionally stable moldings in short cycle times.

Because of the high rate of crystallization, even at low temperatures, little difficulty is encountered in removing the moldings from the molds. Even so, it is desirable to provide molding compositions having improved mold releasability. It has been previously known to improve mold releasability, as shown by lower molding pressure, of thermoplastic polyester compositions, particularly poly(ethylene terephthalate) and poly(1,4-butylene terephthalate), by incorporating therein high pressure low density polyethylene (Cohen U.S. Pat. No. 4,185,047, incorporated by reference). However, it is also well known that high pressure low density polyethylene is not compatible therewith, resulting in blends with poor dispersion and a separating out of the low density polyethylene.

Mathews et al (U.S. Pat. No. 3,944,699) and Yamane et al (U.S. Pat. No. 3,900,549) disclose thermoplastic polyester/low density polyethylene blends which have improved opacity for films and spinnability for composite filaments, respectively. Here, however, it is believed the non-compatibility accounts for the improvement. Similarly, Seydl et al (U.S. Pat. No. 3,937,757) and McConnell et al (U.S. Pat. No. 4,217,426) disclose such blends wherein tracking resistance and grindability are improved. Again, improvement in the properties is believed to be due to the non-compatibility. It has also been found that high pressure low density polyethylene is a good impact modifier for thermoplastic polyesters "U.S. Pat. No. 3,405,198", however, only very small amounts of polyethylene may be used due to the non-compatibility.

It has recently been disclosed that linear low density polyethylene when added to an aromatic polycarbonate resin results in a molding composition that may be utilized for molded articles having improved weld line strength and heat stability. See Research Disclosure #20810 P. 309 August 1981, incorporated herein by reference. Further, such compositions retain good impact strength and decrease the loss of other mechanical properties, such as tensile strength or heat distortion temperature under load, at increased part thickness as compared to control samples of either standard polycarbonate or a commerical polycarbonate blend with polyethylene.

It has now been discovered that thermoplastic polyester molding compositions having improved compatibility, including weld line strength, reduced plate out, and improved flow and mold releasability may be produced by incorporating an effective amount of linear low density polyethylene into the compositions. These improvements are also found in mineral reinforced thermoplastic polyester compositions.

SUMMARY OF THE INVENTION

According to this invention, there are provided thermoplastic compositions which are useful for molding or extrusion, e.g., injection molding, injection blow molding, compression molding, transfer molding, profile extrusion, extrusion blow molding and the like, the compositions having improved compatibility and mold releasability comprising:

(a) a high molecular weight thermoplastic polyester resin, and (b) an effective amount of linear low density polyethylene (LLDPE) for improved compatibility and mold releasability.

More specifically, the high molecular weight thermoplastic polyester resins (a) to which the invention is applicable include:

(i) poly(ethylene terephthalate), (ii) poly(1,4-butylene terephthalate), (iii) an aliphatic/aromatic co-polyester derived from one or more dicarboxylic acids selected from the group consisting essentially of terephthalic acid, isophthalic acid, naphthalene dicarboxylic acids, phenyl indane dicarboxylic acids, compounds of the formula

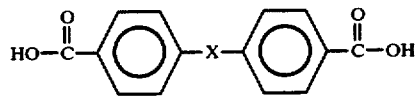

in which X may be alkylene or alkylidene of from 1 to 4 carbon atoms, carbonyl, sulfonyl, oxygen or a bond between the benzene rings, and an aliphatic dicarboxylic acid having from 6 to 12 carbon atoms in the chain and one or more straight or branched chain aliphatic or cycloaliphatic glycols having from 2 to 10 carbon atoms in the chain.

(iv) a block co-polyester derived from terminally reactive blocks of (i) and (ii), wherein said co-polyester (ii) has at least 10% of aliphatic units being derived from a dicarboxylic acid, or a terminally reactive aliphatic polyester of a straight chain aliphatic dicarboxylic acid having from 2 to 12 carbon atoms in the chain and a straight or branched chain aliphatic glycol, said blocks being connected by interterminal linkages consisting essentially of ester linkages, (v) Blends of i, ii, iii and iv or any combination thereof.

The compositions of this invention may also contain an aromatic polycarbonate to enhance impact strength. Furthermore, the compositions of the invention may also contain fillers, reinforcing agents, nucleating agents, flow promotors, coloring agents, flame retardants, stabilizers, impact modifiers and coupling agents in effective amounts.

DETAILED DESCRIPTION OF THE INVENTION

The high molecular weight thermoplastic polyesters used in the practice of the invention are polymeric glycol esters of terephthalic acid and isophthalic acid. They are available commerically, e.g., General Electric Company, Pittsfield, Massachusetts under the Trademark VALOX ®- or can be prepared by known techniques, such as by the alcoholysis of esters of phthalic acid with a glycol and subsequent polymerization, by heating glycols with free acids or with halide derivatives thereof, and similar processes. These are described in U.S. Pat. Nos. 2,465,319 and 3,047,539, and elsewhere.

Although the glycol portion of the polyester can contain from 2 to 10 carbon atoms, it is preferred that it contain 2 to 4 carbon atoms in the form of linear alkylene chains.

Preferred polyesters will be of the family consisting of high molecular weight, polymeric glycol terephthalates or isophthalates having repeating units of the general formula:

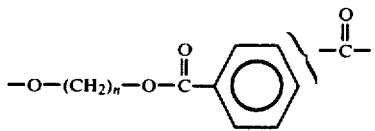

wherein n is a whole number of from 2 to 4, and mixtures of such esters, including co-polyesters of terephthalic and isophthalic acids of up to 30 mole percent isophthalic units.

Especially preferred polyesters are poly(ethylene terephthalate) and poly(1,4-butylene terephthalate). Special mention is made of the latter because it crystallizes at such a good rate that it may be used for injection molding without the need for nucleating agents or long cycles, as is sometimes necessary with poly(ethylene terephthalate).

Illustratively, high molecular weight thermoplastic polyesters will have an intrinsic viscosity of at least about 0.4 decilliters/gram and, preferaby, at least 0.7 decilliters/gram as measured in a 60:40 phenol-tetrachloroethane mixture at 30° C. At intrinsic viscosities of at least about 1.1 decilliters/gram, there is a further enhancement of toughness of the present compositions.

The invention is also applicable to co-polyesters which may be prepared by ester interchange in accordance with standard procedures. Preferably, the co-polyesters are derived from terephthalic acid and/or isophthalic acid and/or derivatives thereof and a glycol, which may be a straight or branched chain aliphatic/cycloaliphatic glycol. Illustratively, the glycol will be ethylene glycol; 1,4-butanediol; 1,5-pentanediol; 1,6-hexanediol; 1,9-nonanediol; 1,10-cyclohexanedimethanol, a mixture of any of the foregoing, or the like. Additional dicarboxylic acids suitable for the co-polyesters include naphthalene dicarboxylic acids, phenyl indane dicarboxylic acid, compounds of the formula

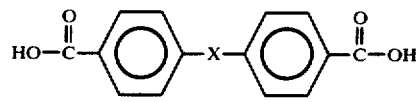

in which X may be alkylene or alkylidene of from 1 to 4 carbon atoms, carbonyl, sulfonyl, oxygen, or a bond between the benzene rings, and aliphatic dicarboxylic acids having from 6 to 12 carbon atoms in the chain including but not limited to suberic acid, sebacic acid, azelaic acid, adipic acids and the like.

Block co-polyesters useful in the composition of this invention are prepared by the reaction of terminally-reactive poly(1,4-butylene terephthalate), preferably, low molecular weight, and a terminally-reactive polyester or co-polyester in the presence of a catalyst for transesterification, such as zinc acetate, manganese acetate, titanium esters and the like. The terminal groups can comprise hydroxyl, carboxyl, carboalkoxy, and the like, including reactive derivitives thereof. The result of a reaction between the two terminally reactive groups, of course, must be an ester linkage.

After initial mixing, polymerization is carried out under standard conditions, e,g., 220° to 280° C., in a high vacuum, e,g., 0.1 to 2 mm Hg to form the block co-polymer of minimum randomization in terms of distribution of claim segments. These block copolyesters are described in abandoned application Ser. No. 752,325 filed Dec. 20, 1976, incorporated herein by reference.

The co-polyester designated component of these block co-polyesters may be terminally reactive segments of the co-polyester as described herein above. Again, most preferably, these co-polyesters are derived from an aliphatic glycol and an admixture of aromatic and aliphatic dibasic acids in which the mole ratio concentration of aromatic to aliphatic acids is from 1 to 9 to about 9 to 1, with an especially preferred range of from 3 to 7 to about 7 to 3.

The terminally reactive aliphatic polyester designated component of the block co-polyester will contain substantially stoichiometric amounts of the aliphatic diol and the aliphatic dicarboxylic acid, although hydroxy-containing terminal groups are preferred.

In addition to their ease of formation by well-known procedures, both the aromatic/aliphatic co-polyesters and the aliphatic polyester suitable for use in the block co-polymers are commercially available. One source for such materials is the Ruco Division/Hooker Chemical Company, Hicksville, N.Y., which designates its compounds as "Rucoflex".

The block co-polyesters used in the invention preferably comprise from 95 to 50 parts by weight of poly(1,4-butylene terephthalate) segments. The poly(1,4-butylene terephthalate) blocks, before incorporation into the block co-polyesters, as well as the co-polyester described herein above, will preferably have an intrinsic viscosity of above 0.1 dl/g and preferably, between 0.1 and 0.5 dl/g, as measured in a 60:40 mixture of phenol tetrachloroethane at 30° C. The balance, 50 to 5 parts by weight of the block co-polyester will comprise blocks of the aforementioned aliphatic/aromatic co-polyesters and/or aliphatic polyesters.

As will be understood by those skilled in the art, the poly(1,4-butylene terephthalate) block can be straight chain or branched, e.g., by use of a branching component, e.g., 0.5 to 1 mole percent, based on terephthalate units, of a branching component which contains at least 3 ester-forming groups. This can be a polyol, e.g. pentacrythritol, trimethylolpropane, and the like or a poly basic acid compound, e.g., trimethyl trimestate, and the like.

The invention is also applicable to blends of poly(ethylene terephthalate), poly(1,4-butylene terephthalate), the foregoing copolyesters and/or block co-polyesters and/or derivatives thereof, or any combination of these.

The linear low density polyethylene useful for the present invention are well known materials, they are available commerically, e.g. from Exxon under the tradename Escorene or from Dow Chemicals under the tradename DOWLEX. Alternatively, they may readily be prepared by state of the art polymerization processes such as those described in U.S. Pat. Nos. 4,354,009, 4,076,698, European Patent Application No. 4645 (published 10-17-79), and U.S. Pat. No. 4,128,607, all incorporated herein by reference. These polymers have a density between about 0.89 and about 0.96 gram/cc, preferably between about 0.915 and 0.945 grams/cc. These linear low density polyethylene polymers are actually co-polymers of ethylene and a minor amount, less than 20 mole percent, preferably less than 15 mole %, of an alpha olefin of 3 to 18 carbon atoms, preferably 3 to 10 carbon atoms, most preferably 4 to 8 carbon atoms. These linear low density polyethylenes are distinguishable from polymers such as high pressure low density polyethylene and high density polyethylene made from Zeigler catalyst systems in that they are substantially free of side chain branching, having a controlled concentration of simple side chain branching as opposed to random branching.

The preferred linear low density polyethylene copolymers are prepared from ethylene and one or more alpha olefins selected from the group consisting of propylene, butene-1, pentene-1, 4 methyl pentene-1, hexene-1 and octene-1, most preferably butene-1 and octene-1. Polymers of desired density may be obtained by controlling the co-polymerization ratio of alpha olefin and the formation proportion of the polymer during co-polymerization. The addition of increasing amounts of the co-monomers to the co-polymers results in lowering the density of the co-polymer.

The melt indices of the linear low density polyethylenes useful for the present invention may vary widely. However, when using linear low density polyethylene derived from ethylene and a short chain, e.g. butene-1, monomer, it is preferred that such linear low density polyethylenes have melt indices of at least 5, preferrably at least 10, most preferrably at least about 12 gm/10 min. With linear low density polyethylenes derived from longer chain, e.g. octene-1, monomers, the melt indices of the linear low density polyethylenes may be even lower.

In general, the co-polymerization of linear low density polyethylene can take place in either a gas phase fluidized bed reaction or liquid phase solution process reactor, preferably the former, at pressures ranging from normal to 5000 psi, preferably less than 1000 psi and at temperatures of from 20° C. to 310° C., preferably 30° C. to 115° C. in the presence of a suitable high activity catalysts. Typical catalyst systems comprise transition metal complex catalyst preferably composed of at least one compound of a transition element of groups IVa, Va, and VIa having a halide and/or hydrocarbon group attached to said transition metal and a reducing component such as a metal halide or a compound having metal attached directly to carbon, e.g. metal alkyl. Highly satisfactory catalyst systems have a halide on titanium and wherein the effective organo metallic components are metal alkyl compounds having aluminum as the metal, especially Li Al(hydrocarbon)$_4$. Such systems include for example TiCl$_4$ & LiAl(alkyl)$_4$, VOCL$_3$ & Li(alkyl), MoCl$_3$ & Al(Alkyl)$_3$, TiCl$_4$ & alkyl Mg Br, etc. Catalyst systems such as these as well as other useful catalysts systems are disclosed in U.S. Pat. Nos. 4,354,009, 4,076,698, Eur. Application No. 4645 and U.S. Pat. No. 4,128,607 above. Such catalyst systems are used in a molar ratio of ethylene to catalyst in a range of 35,000 to 400,000 to one.

The preferred linear low density polyethylene co-polymers so produced have an unsaturated group content of $\leq 1$ and preferably from about 0.1 to about 0.3 C=C/1000 carbon atoms and a n-hexane extractables content (at 50° C.) of less than about 3, preferably less than 2, weight percent. The preferred materials are made by the Unipol process which is described in Chem. Eng., Dec. 3, 1979, pp. 80–85 which is incorporated by reference.

Additionally, these high molecular weight thermoplastic polyester/linear low density polyethylene blends may also have added thereto, an aromatic polycarbonate to enhance impact strength. The aromatic polycarbonates useful in the invention include any of these known in the art. Generally speaking, those aromatic polycarbonates may be prepared by reacting a dihydric phenol with a carbonate precursor such as phosgene, a haloformate or a carbonate ester in accordance with the methods set forth in U.S. Pat. Nos. 2,993,835; 3,028,365; 4,018,750 and 4,123,436 or by transesterification processes such as are disclosed in U.S. Pat. No. 3,153,008, all incorporated herein by reference, as well as other processes known to those skilled in the art.

The polycarbonates so produced are typified as possessing recurring structural units of the formula:

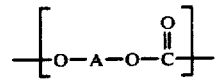

where A is a divalent aromatic radical of the dihydric phenol employed in the polymer producing reaction. Generally, these "High molecular weight" aromatic carbonate polymers have intrinsic viscosities (as measured in methylene chloride in deciliters/gram at 25° C.) of greater than about 0.30.

The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2bis-(4-hydroxyphenyl)-propane; 2,2 bis-(4-hydroxyphenyl)-pentane; 2,2 bis-(4-hydroxy 3 methylphenyl)-propane; 2,2 bis-(4-hydroxy 3,5 dichlorophenyl)propane; 2,2 bis-(4-hydroxy 3,5 dibromophenyl)propane; 1,1 bis-(4-hydroxyphenyl)-ethane; 4,4'dihdroxy 3,3 dichlorodiphenylether. Most preferably, the polycarbonates to be used for the present invention are those prepared from 2,2-bis(4-hydroxyphenyl)propane. A variety of additional dihydric phenols which may be employed to provide such carbonate polymers are disclosed in Goldberg, U.S. Pat. No. 2,993,835, assigned to the assignee of the present invention, incorporated by reference.

It is of course possible to employ two or more different dihydric phenols or a dihydric phenol in combination with a glycol, a hydroxy or acid terminated polyester, or a dibasic acid in the event a carbonate copolymer rather than a homopolymer is desired for use in the practice of the invention. Thus, it should be understood that the term "polycarbonate resin" embraces within its scope carbonate co-polymers.

Furthermore, the composition of the present invention may further comprise an effective amount of any of the known impact modifiers useful for polyesters and polyester blends. These may be added to the compositions by themselves or in combination with the aforementioned aromatic polycarbonates.

The preferred impact modifiers generally comprise an acrylic or methacrylic grafted polymer of conjugated diene or an acrylate elastomer, alone or copolymerized with a vinyl aromatic compound. Especially preferred grafted polymers are the core-shell polymers of the type available from Rohm & Haas, for example Acryloid KM653, Acryloid KM330 and Acryloid KM611. In general these impact modifiers contain units derived from butadiene or isoprene, alone or in combination with a vinyl aromatic compound, or n-butyl acrylate, alone or in combination with a vinyl aromatic compound. The aforementioned impact modifiers are believed to be disclosed in Fromuth et. al. U.S. Pat. Nos. 4,180,494; Owens 3,808,180; Farnham et. al. 4,096,202; and Cohen et al 4,260,693, all incorporated herein by reference. Most preferably, the impact modifier will comprise a two stage polymer having either a butadiene or n-butyl acrylate based rubbery core and a second stage polymerized from methymethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional preferred impact modifiers are of the type disclosed in U.S. Pat. No. 4,292,233, incorporated by reference. These impact modifiers comprise, generally, a relatively high content of a cross-linked butadiene polymer grafted base having grafted thereon acryonitrile and styrene.

Other suitable impact modifiers include, but are not limited to ethylene vinyl acetate, ethylene ethylacrylate copolymers, etc.

Optionally, the compositions of this invention may further contain one or more reinforcing agents. Typical reinforcing agents useful for the invention include but are not limited to, glass fiber, mica or both.

The filamentous glass that may be used in the embodiments of this invention is well known to those skilled in the art and is widely available from a number of manufacturers. The glass may be untreated or, preferably, treated with silane or titanate coupling agents, etc. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastic reinforcement are made by mechanical pulling.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.0005 to 0.125 inch.

The linear low density polyethylene modified polyesters of this invention can be rendered flame retardant with an effective amount of a conventional flame retardant agent. As is well known, flame retardants can be based on elementary red phosphorus, phosphorous compounds, halogen and nitrogen compounds alone or preferably in further combination with synergists, such as antimony compounds. Especially useful are polymeric and oligomeric flame retardant agents comprising tetrabromo bisphenol-A carbonate units, e.g., Wambach—U.S. Pat. No. 3,833,685, incorporated herein by reference.

Other ingredients such as dyes, pigments, drip retardants, flow promoters, fillers (especially mineral fillers), nucleating agents, coupling agents, and stabilizers, and the like, can be added in effective amounts known in the art for their conventionally employed purposes. Generally, suitable stabilizer systems include (a) a hindered phenolic antioxidant, (b) an aromatic amine, (c) a thioester and (d) optionally, a trivalent phosphorus compound, e.g., a phosphite.

The formulation and the proportionment of ingredients of the compositions of the invention vary depending upon the desired properties and end use of the final compositions. In general the compositions comprise in percent by weight based on the total composition, about 99 to 10% polyester resin (a); about 0.1 to 20%, preferably about 0.5 to 14%, most preferably about 1-5% linear low density polyethylene (b). Furthermore, in addition to the aforementioned polyester/linear low density polyethylene compositions, such compositions further comprising up to 70% by weight of an aromatic polycarbonate are within the scope of the invention.

The above compositions may also contain 0 to 25 percent by weight, preferably 5 to 20 percent, of an impact modifier or 0 to 50% of a reinforcing agent. Finally, the various stabilizers and like agents can be present in amounts of from about 0.05 to 5% by weight based on the total compositions. Preferred amounts depend upon the particular agent used and the results desired.

The compositions of the present invention are prepared in conventional ways. For example, in one method, the linear low density polyethylene, and impact modifier and other ingredients, if used, are all placed into an extrusion compounder with the thermoplastic polyester resin to produce molding pellets. The linear low density polyethylene and other ingredients are dispersed in a matrix of the thermoplastic polyester in the process. In another procedure, the linear low density polyethylene and the other above-identified ingredients, if used, are mixed with the thermoplastic polyester resin by dry-blending, then either fluxed on a mill and comminuted, or then are extruded and chopped. Alternatively, the ingredients can also be mixed with the powdered or granular thermoplastic polyester resin and directly molded, e.g., by injection or transfer molding techniques. It is always important to thoroughly free the thermoplastic resin, linear low density polyethylene and the other aforementioned ingredients, if used, from as much water as possible.

In addition, compounding should be carried out to insure that the residence time in the machine is short; the temperature is carefully controlled; the friction heat is utilized, and an intimate blend between the additives and the thermoplastic resin is obtained.

Although it is not essential, best results are obtained if the ingredients are pre-compounded, pelletized, and then molded. Pre-compounding can be carried out in conventional equipment. For example, after carefully pre-drying the thermoplastic polyester, e.g., at 125° C. for 4 hours, a single screw extruder is fed with a dry blend of the polyester resin (a) and the linear low density polyethylene and, any other above-identified ingredients to be used, the screw employed having a long transition and metering section to insure melting. On the other hand, a twin screw extrusion machine, e.g., a 28mm Werner Pfleiderer machine can be fed with resin, linear low density polyethylene and additives, if used, at the feed port. In either case, a generally suitable machine temperature will be about 450° to 570° F.

The pre-compounded composition can be extruded and put up into molding compounds such as conventional granules, pellets, etc., by standard techniques.

The compositions of this invention can be molded in any equipment conventionally used for thermoplastic compositions. For example, with poly(1,4-butylene terephthalate) good results will be obtained in an injection molding machine, e.g., of the Newbury type with conventional mold temperatures, e.g., 150° F. On the other hand, with poly(ethylene terephthalate), because of the lack of uniformity of crystallization from interior to exterior of thick pieces, somewhat less conventional but still well known techniques can be used. For example, a nucleating agent such as LiOH, graphite or a metal oxide, e.g., ZnO or MgO, can be included and standard mold temperatures of at least 230° F. will be used.

In order that those skilled in the art may better understand how to practice the present invention, the following examples are given by way of illustration and not by way of limitation.

The term Double gate is used to refer to the preparation of a molded sample in a mold having two entry ports that result in a weld line at the juncture of the fluid resin in the mold during the molding cycle. The design preparation of the molded part and testing of the following examples are according to ASTM D256.

EXAMPLES E1–E4—COMPARATIVE EXAMPLES CE1–CE3

Dry blends of poly(1,4-butylene terephthalate), linear low density polyethylene and antioxidant stabilizer were compounded and extruded through a single screw extruder at 450°–500° F. For comparison purposes blends using high pressure low density polyethylene and a high density polyethylene were also prepared. The extrudates were pelletized and injection molded at 490° F. on a VanDorn molding machine (mold temperature 150° F.) to produce test bars measuring $2\frac{1}{2} \times \frac{1}{2} \times \frac{1}{8}$ inch for determination of Double Gate, unnotched Izod Impact Strength. The formulations and physical properties are shown in Table 1.

A comparison of Example 1–4 with comparative examples 2 and 3 reveals the dramatic improvement in compatibility as evidenced by weld line strength as determined by double gate unnotched Izod according to ASTM D256, achieved in blends of linear low density polyethylene and PBT as compared to the prior art compositions of PBT blended with either low density polyethylene or high density polyethylene made at high pressure, respectively.

TABLE I

|  | CE 1 | CE 2 | CE 3 | E 1 | E 2 | E 3 | E 4 |
|---|---|---|---|---|---|---|---|
| VALOX 310[a] | 100 | 98.35 | 98.35 | 98.35 | 98.35 | 98.35 | 98.35 |
| Microthene (FN-510)[b] | — | 1.5 | — | — | — | — | — |
| Norchem (NPE 831)[c] | — | — | 1.5 | — | — | — | — |
| Escorene (LPX-16)[d] | — | — | — | 1.5 | — | — | — |
| Escorene (LPX-15)[e] | — | — | — | — | 1.5 | — | — |
| Escorene (LPX-12)[f] | — | — | — | — | — | 1.5 | — |
| DOWLEX (61500-0.4)[g] | — | — | — | — | — | — | 1.5 |
| *Double Gate, Unnotched Izod, (ft. lbs.) | 33.3 | 19.0 | 13.3 | 38.8 | 36.4 | 22.6 | 32.6 |

[a]General Electric Company - poly(1,4-butylene terephthalate), about 0.9 intrinsic viscosity measured in a solution of phenol and tetrachlorethane (60:40) at 30° C.
[b]U.S. Industrial Chemicals - low density polyethylene
[c]Northern Petrochemical Company - high density polyethylene
[d-f]EXXON - linear low density polyethylene co-polymer of ethylene and butene-1, melt indices of 12; 20 and 5 gm/10 min., respectively
[g]Dow Chemical Company - linear low density polyethylene co-polymer of ethylene and octene-1, melt index 4 gm/10 min.
*Double gate unnotched Izod is a measure of weld line strength/compatibility
Note: The above formulations also contain a stabilizing amount of a hindered phenolic antioxidant.

These compositions also show improvement in mold releasability and overcome problems of plate out which is often encountered in the prior art compositions. Comparison of Examples E1–E4 with comparative example CE1 shows that the overall quality of the compositions of the present invention with respect to weld line strength/compatibility is at least equivalent, or nearly so, to the PBT homopolymer itself.

EXAMPLE E5—COMPARATIVE EXAMPLE CE5

Compositions and comparative compositions containing mineral fillers were prepared according to the general procedure above, molded and tested with the following results:

TABLE 2

|  | CE 5 | E 5 |
|---|---|---|
| Composition |  |  |
| VALOX 315[a] | 88.23 | 88.23 |
| LPX-11[b] | — | 1.5 |
| Translink 445[c] | 10.0 | 10.0 |
| Norchem[d] (NPE 831) | 1.5 | — |
| Properties |  |  |
| Notched Izod, ft. lbs./in. | 0.85 | 0.90 |
| Double-Gated Unnotched Izod, ft. lbs. | 8.4 | No Break |

TABLE 2-continued

|                         | CE 5 | E 5  |
|-------------------------|------|------|
| Mold Release Pressure, psi | 5.10 | 4.99 |

[a] General Electric Company - poly(butylene terephthalate), about 1.1 intrinsic viscosity in a solution of phenol and tetrachloroethane (60:40) at 30° C.
[b] EXXON Chemical Company - linear low density polyethylene copolymer of ethylene and butene-1, melt index 50 gm/10 min.
[c] Freeport Kaolin Co. - Kaolin Clay
[d] Northern Petrochemical Company - high density polyethylene
*Note:
The above formulations also contain stabilizing amounts of a hindered phenolic antioxidant and a phosphite stabilizer and an effective amount of a silane coupling agent.

A comparison of Example E5 and comparative example CE5 shows that in mineral reinforced products, linear low density polyethylene gives better compatibility as measured by double-gate unnotched izod impact strength as well as improved mold releasability.

EXAMPLE E6—COMPARATIVE EXAMPLE CE6

Compositions further comprising an impact modifier system of a combination of aromatic polycarbonate and a core-shell polymer were prepared according to the general method of Example E1. The specific compositions and test results are presented in Table 3.

TABLE 3

|                              | CE 6      | E 6       |
|------------------------------|-----------|-----------|
| Composition                  |           |           |
| VALOX 315[a]                 | 65.0      | 65.0      |
| Microthene[b]                | 1.5       | —         |
| LPX-11[c]                    | —         | 1.5       |
| LEXAN 131[d]                 | 15.0      | 15.0      |
| KM-653[e]                    | 15.0      | 15.0      |
| Properties                   |           |           |
| Notched Izod, ft. lbs./in.   | No Break  | No Break  |
| Double-Gated Unnotched Izod,* ft. lbs./in. | No Break  | No Break  |
| Mold Release Pressure, psi   | 3.67      | 2.96      |

[a] General Electric Company - poly(1,4-butylene terephthalate), about 1.1 intrinsic viscosity in a solution of phenol and tetrachloroethane (60:40) at 30° C.
[b] U.S. Industrial Chemicals - low density polyethylene
[c] EXXON - linear low density polyethylene copolymer of ethylene and butene-1, melt index 50 gm/10 min.
[d] General Electric Company - polycarbonate of Bisphemool A
[e] Rohm & Haas - BD/Sty-MMA core shell polymer
*Double gate unnotched izod is a measure of compatibility as exemplified by weld line strength.
**Note:
The above formulations also contain effective amounts of hindered phenolic antioxidant, thioester and aromatic amine stabilizer.

From Table 3, it is apparent that impact modified compositions having added thereto linear low density polyethylene have improved mold releasability with retention of other physical properties such as impact strength and weld line strength. These compositions show further improvement in compatibility and flow properties as well as overcome plate out problems encountered in the prior art.

EXAMPLES E7–E11

Compositions based on high amounts of both polyester and polycarbonate together with an impact modifier and the linear low density polyethylene were prepared according to the aforementioned method. The specific formulations and properties are shown in Table 4.

TABLE 4

|                    | E7    | E8    | E9    | E10   | E11   |
|--------------------|-------|-------|-------|-------|-------|
| Valox 310[a]       | 39    | 39    | 39    | 39    | 39    |
| Lexan 140[b]       | 50.3  | 50.33 | 48.33 | 45.33 | 48.33 |
| Acryloid KM611[c]  | —     | 8.5   | —     | —     | —     |
| Acryloid KM330[d]  | 8.5   | —     | 8.5   | 8.5   | 8.5   |
| Escorene LPX12[e]  | 2     | 2     | 2     | 2     | 4     |
| Lexan 325[f]       | —     | —     | 2     | 5     | —     |
| ⅛" Notched Izod    | 15.49 | 14.27 | 13.87 | 10.67 | 14.56 |
| ft lb/in           |       |       |       |       |       |
| ⅛" Notched Izod    | 10.76 | 8.92  | 9.58  | 7.67  | 9.93  |
| ft lb/in           |       |       |       |       |       |
| Double Gate Unnotched Izod ft lb | 31.77 | 25.94 | 22.63 | 23.96 | 16.41 |

[a] General Electric Company - poly(1,4 butylene terephthalate) about 0.9 intrinsic viscosity as measured in a solution of phenol and tetrachloroethane (60:40) at 30° C.
[b] General Electric Company - polycarbonate of Bisphenol A.
[c] Rohm & Haas - Sty-BD/MMA-Sty core shell polymer
[d] Rohm & Haas - n-butyl acrylate/MMA core shell polymer
[e] EXXON - Linear low density polyethylene melt index of 5 g/10 min. according to ASTM D1238.
[f] General Electric Company - copolycarbonate
Note:
The above formulations also contain stabilizing amount of a hydrolytically stabilizing epoxide stabilizer and a hindered phenolic antioxidant as well as a silicone oil.

The impact modified polyester - polycarbonate blends of examples E7–E11 showed good compatibility, thus weld line strength, as evidenced by the high values obtained for double gate unnotched izod. Implicit with such results and as experienced, those compositions did not suffer the plate out problems encountered in similar compositions having high pressure low density polyethylene. Futhermore, these compositions had improved flow and mold release properties as well as retention of good notched izod impact strengths.

Examples E9 and E10 show the applicability of this invention to compositions also containing copolycarbonates.

Finally, example E11 shows that higher amounts of low pressure, linear low density polyethylene may be used, however with increasing amounts some loss of compatibility maybe experienced.

Obviously, other modifications and variations of the present invention are possible in light of the above teachings. It is, therefore, to be understood that changes may be made in the particular embodiments of the invention described which are within the full intended scope of the invention as defined by the appended claims.

What is claimed is:

1. A thermoplastic molding composition comprising
   (a) poly(1,4-butylene terephthalate) and
   (b) from 0.1 to about 20 percent by weight based on (a) & (b) of a linear low density polyethylene, which is a copolymer of ethylene and butene-1, having a density of from about 0.89 to about 0.96 grams/cc and a melt index of at least about 5 gm/10 min.

2. The composition as defined in claim 1 wherein the linear low density polyethylene has a density of from about 0.915 to 0.945 grams/cc.

3. The composition of claim 1 wherein the linear low density polyethylene comprises about 0.5 to 14% by weight of the resinous components.

4. The composition of claim 1 wherein the linear low density polyethylene comprises about 1 to about 5% by weight of the resinous components.

5. The composition of claim 1 which further comprises a reinforcing amount of a reinforcing agent.

6. The compositions as defined in claim 1 which further contains an effective amount at least one additive selected from the group consisting of flow promoters, flame retardants, fillers, reinforcing agents, coloring agents, drip retardants, nucleating agents, impact modifiers, coupling agents, and stabilizers.

7. The composition as defined in claim 1 which further contains in effective amount at one additive selected from the group consisting of flow promoters, flame retardants, fillers, reinforcing agents, coloring agents, drip retardants, nucleating agents, impact modifiers, coupling agents, and stabilizers.

* * * * *